US008195766B2

(12) United States Patent
Lin et al.

(10) Patent No.: US 8,195,766 B2
(45) Date of Patent: Jun. 5, 2012

(54) DYNAMIC IMPLICIT LOCALIZATION OF WEB CONTENT

(75) Inventors: Andrew Cheng-min Lin, Seattle, WA (US); David Serge Ebbo, Redmond, WA (US); Eilon J. Lipton, Bellevue, WA (US); Simon Calvert, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1567 days.

(21) Appl. No.: 11/081,122

(22) Filed: Mar. 15, 2005

(65) Prior Publication Data

US 2006/0212575 A1 Sep. 21, 2006

(51) Int. Cl.
*G06F 15/16* (2006.01)

(52) U.S. Cl. ...................................................... 709/219

(58) Field of Classification Search .................. 709/219
See application file for complete search history.

(56) References Cited

U.S. PATENT DOCUMENTS

| 6,859,820 | B1 * | 2/2005 | Hauduc et al. ................ 709/203 |
| 6,934,908 | B2 * | 8/2005 | Fox et al. ....................... 715/234 |
| 6,993,568 | B1 * | 1/2006 | Hauduc et al. ................ 709/217 |
| 7,178,101 | B2 * | 2/2007 | Tunning ........................ 715/236 |
| 7,316,003 | B1 * | 1/2008 | Dulepet et al. ................ 717/111 |
| 7,441,184 | B2 * | 10/2008 | Frerebeau et al. ............ 715/234 |
| 7,461,123 | B2 * | 12/2008 | Hauduc et al. ................ 709/203 |
| 2003/0135501 | A1 * | 7/2003 | Frerebeau et al. ............ 707/100 |
| 2004/0128614 | A1 * | 7/2004 | Andrews et al. ........... 715/501.1 |
| 2004/0205118 | A1 * | 10/2004 | Yu ................................. 709/203 |
| 2004/0268231 | A1 * | 12/2004 | Tunning ........................ 715/513 |
| 2005/0097185 | A1 * | 5/2005 | Gibson et al. ................. 709/217 |
| 2005/0114446 | A1 * | 5/2005 | Hauduc et al. ................ 709/203 |
| 2005/0197827 | A1 * | 9/2005 | Ross et al. ........................ 704/2 |
| 2008/0271045 | A1 * | 10/2008 | Le Roy et al. ................ 719/311 |

FOREIGN PATENT DOCUMENTS

GB      2403306 A  * 12/2004

* cited by examiner

*Primary Examiner* — Wing Chan
*Assistant Examiner* — Alicia Baturay
(74) *Attorney, Agent, or Firm* — Merchant & Gould

(57) ABSTRACT

A web page generator dynamically and implicitly generates localized web content. A web developer can mark the content of a page (including controls and literal content) with resource keys, and can dynamically process this request by dynamically substituting the marked content with localized content. Multiple properties of the controls within a page may be localized.

18 Claims, 2 Drawing Sheets

DYNAMIC IMPLICIT LOCALIZATION OF WEB CONTENT

BACKGROUND

The World Wide Web is largely universally accessible throughout the entire world. Website developers typically develop web pages in accordance with their own language. If the developers desire to publish a website that appeals to the global population, the content can be "localized" such that the content is readable and acceptable by the various cultures of the world. The process of localization usually requires creating a separate set of content for each culture or writing some code to modify the content of each page for a specific culture. The difficulty in implementing this process is compounded when pages generated by the website are to be generated automatically.

SUMMARY

The present disclosure is directed to dynamic implicit localization of web content. A web developer can mark the content of a page (including controls and literal content) with resource keys, and can dynamically process this request by dynamically substituting the marked content with localized content. Multiple properties of the controls within a page may be localized.

In accordance with one aspect of the invention, a computer-implemented method is disclosed for dynamically localizing content, comprising: receiving a request for media content, wherein the request is received from a client having an associated culture; searching the requested media content for areas of localizable content wherein each area is associated with an identifier; using the identifiers of the localizable content to reference at least one information source containing localized information for the associated culture to obtain localizable content identified by the identifier for each area; and substituting areas of the requested media content in accordance with the localizable content obtained by using the identifiers.

DETAILED DESCRIPTION OF THE PREFERRED EMBODIMENT

The present disclosure is directed to dynamic implicit localization of web content. A web developer can mark the content of a page (including controls and literal content) with resource keys, and can dynamically process this request by dynamically substituting the marked content with localized content. Multiple properties of the controls within a page may be localized.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
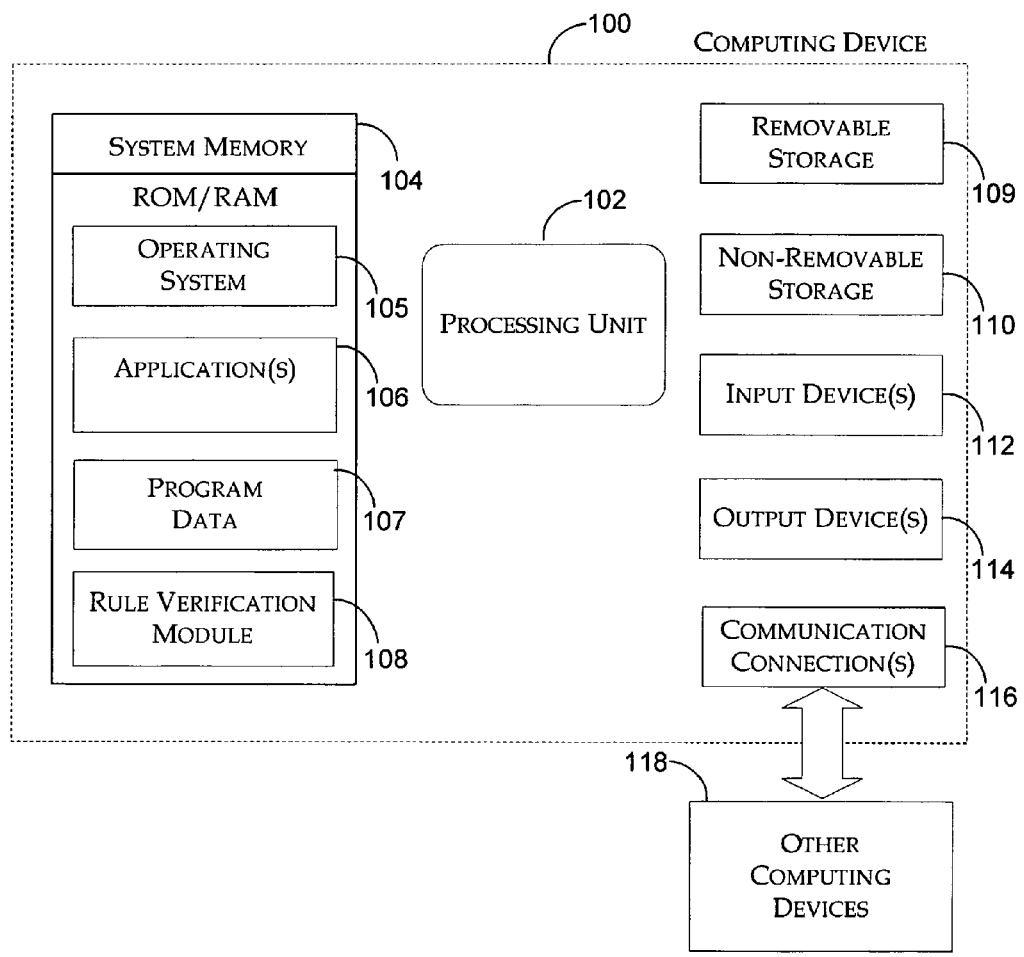
FIG. 1 illustrates a computing device that may be used according to an example embodiment of the present invention.
Figure 2:
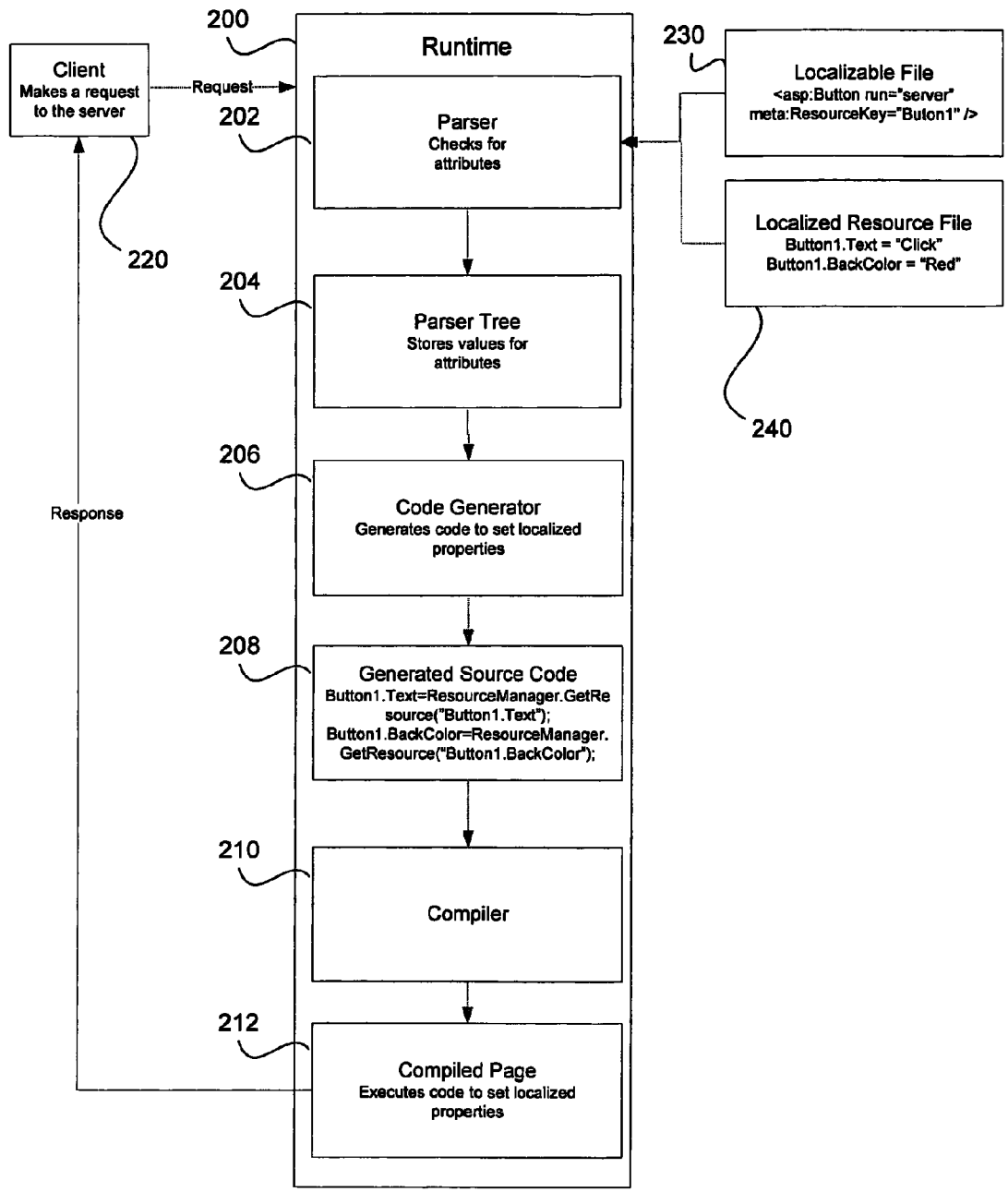
FIG. 2 illustrates a block diagram of a system for dynamic implicit localization of web content, in accordance with at least one aspect of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A rule verification module 108, which is described in detail below with reference to FIGS. 2-4, is implemented within system memory 104.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Dynamic Implicit Localization of Web Content

A web developer can mark the content of a localizable page with resource keys. The runtime can dynamically process a request by a client for this page by substituting localized content from an external resource file into the marked content of a page to be sent to the requesting client.

For example, a localizable page having the following content:

<asp:Label id="Label1" runat="server"
Text="Non-localized text"
meta:ResourceKey="Label1"/>
<asp:localize runat="server"
meta:ResourceKey="Text1">
[optional non-localized text can go here]
</asp:localize> can be combined with an external resource file (or source) for localization for a French culture, such as:

Label1.Text=Texte localisé
Text1.Text=Un certain texte localisé

The page would dynamically render the non-localized text ('Non-localized text' and 'Some non-localized text') for an arbitrary client using the default culture, and the localized text ('Texte localisé' and 'Un certain texte localisé') for a French client. Accordingly, the web developer is not required to duplicate any content or write any code for each target culture. The developer can simply mark the content with desired resource keys and provide the external resources for localization. However, properties that are not explicitly declared in the markup can also be localized. For example, the BackColor property of the Label could be localized even if there is no BackColor property that is persisted on the <asp:Label>tag.

The web developer can specify which external resource to used for specific cultures by specifying code such as:

APP\MYPAGE.ASPX
\LOCALRESOURCES
MYPAGE.ASPX.EN.RESX
MYPAGE.ASPX.FR.RESX
MYPAGE.ASPX.DE.RESX
MYPAGE.ASPX.JP.RESX . . .

where the "RESX" file is the file containing information for localization.

Accordingly, a person coding the RESX files can provide localization information, without ever having directly modified (or "decorated") information associated with tags comprised by the localizable page. Resource tags are not typically necessary if the tags already have a unique identifier.

FIG. 2 illustrates a block diagram of a system for dynamic implicit localization of web content. The system is described with reference to a framework, such as runtime 200, which dynamically creates web pages having localized content. However, the system is not limited to the web space. The system may be integrated with any type of run time object such that content can be localized in accordance with a client request.

The system includes runtime 200, client 220, localizable file 230, and localized resource 240. Generally, runtime 200 comprises the ability to parse pages and dynamically generate and compile code based on the parsed pages.

A web developer creates localizable file 230 by inserting at least one run time object (e.g., a component) on the page. The component may be a control, a tag, a form, a web service element, or any other run time object. For example, localizable page 230 may include components such as tags and controls. The components may be predefined in the application, imported from a third party source (e.g., a vendor), generated from an existing component or created by the web developer.

Localizable file 230 comprises static content and tags (e.g. <asp:Button Text="hello">). When a first request is made by client 220 to access a page (such as localizable file 230), the page is parsed by Parser 202 into an intermediate form that typically comprises of a collection of objects (parse data) organized into, for example, a tree (e.g., Parser Tree 204). Each Parser contains a list of properties (such as Text, BackColor, and the like) to be set on a control (which may be considered as the runtime representation of the tag) before the page is rendered.

The properties can be used to render pages, for example, that contain colors, music, graphics, languages, and the like that are tailored for a particular culture. Tailoring the page for a particular culture allows the rendered page to be more pleasing, understandable, and the like, to consumers of the localized content, thus enhancing the effectiveness of the publication of the rendered page.

Parser Tree 204 is then traversed to generate code to render the localized page. During the parsing phase, a parser scans the collection of attributes specified on each tag that is parsed and recognizes any well-known attribute name. The values of the attributes are typically provided for input to the code generation phase.

During the code generation phase, Code Generator 206 typically evaluates each Parser to generate code that determines the properties of the control to be used at runtime. The code that is typically generated (Generated Source Code 208) is created, for example, as a separate tree structure that contains controls. The controls represent elements of the tree such as buttons, textboxes, lists, and static content.

When the (localized) page is requested by a client (note: the client does not have to be aware of the localization process), the Generated Source Code 208 is evaluated by compiler 210. The Generated Source Code 208 is traversed and evaluated multiple times during the request lifecycle to produce a rendered markup output (Compiled Page 212) to the client (220). For example, the "page" can be a base class, for which a derived version of the class is produced that has code for setting the localized properties.

In an embodiment, a page is localized in response to a first request for a page in the culture implicated by the request, wherein the localized page is stored and provided in response to subsequent requests that implicate the same culture.

In another embodiment, parser tree 204 is created in a culture-independent way during a first request to the page. When any request to the page occurs (including the first request), the code generated by the tree dynamically looks up the actual localized content on a per-culture basis. In other words, the same exact code is run for English, French, and the like.

Accordingly, an embodiment of the invention makes use of both the parsing and code generation phases of Runtime 200. Using the established software of the framework provides efficiencies in development time and enhanced reliability as compared to being required to code software having the same capabilities.

An example of dynamic implicit localization is now provided. When a Parser comprises a any well-known attribute name, the Parser tries to find an external resource. The external resource can be a file (such as localized resource 240) or any external data store that corresponds to the page.

If, for example, if page was named 'Foo.aspx,' the Parser can search (by default) for a file named 'Foo.resx.' When the file or resource is found, the Parser then scans through the external resource file for any resources that are prefixed with the value of the any well-known attribute name. For any resource matches, the Parser typically scans the rest of the resource name to determine which properties to set on the Control.

For example, where a tag in the localizable file (230) is specified as follows:
<asp:Button Text="Hello"
meta:ResourceKey="Button1"/>
and the external resource file includes the following:
Button1.Text="GoodBye"
Button1.BackColor="Red"
Code Generator 206 generates code to set the Text and BackColor properties of the Button based on the content in the located external resource file (or other source, such as an information store).

The code that is generated may direct a ResourceManager object to fetch resources based on the culture of the executing request. The culture of the executing request can be determined, for example, by header information contained in the request of the client (230), or by a user's preferences that they have selected from a list. Thus, localization can be implicitly accomplished by using the Resource manager to fetch resources (that implicated by localizable file 230) from different external resources depending on the incoming request's culture at runtime.

For example, a request from a client having a French culture would resolve its resources against 'Foo.fr-fr.resx' while a request from a client having an American culture would resolve its resources against 'Foo.en-us.resx'.

An example of the generated code in accordance with the above example can be shown as:
Button1.Text=ResourceManager.GetResource("Button 1.Text")
Button1.BackColor=ResourceManager.GetResource ("Button1.BackColor")

At runtime, the example generated code would initialize Button1's Text and BackColor properties to the values in the proper culture-specific external resource file, and when the Button is rendered to the client, it would reflect the values of those properties.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for dynamically localizing content, comprising:
receiving a request for media content within a web page including components wherein the component is a run time object comprising a control, a tag, a form, and a web service element, wherein the request is received from a client having an associated culture;
parsing the web page into a culture-independent intermediate form that is and that comprises a collection of objects and a list of properties to set on components;
generating code from the culture-independent intermediate form that is used to render the web page, wherein the code dynamically determines the localizable content on a per-culture basis;
storing the code generated in the culture-independent intermediate form and using the stored code for any subsequent request for the media content regardless of the associated culture of the client;
searching the requested media content for areas of localizable content wherein each area is associated with an identifier; wherein each identifier is a tag identifying the component and comprises an attribute name; wherein the localizable content comprises text and properties associated with the component;
using the identifiers of the localizable content to reference at least one information source containing localized information for the associated culture to obtain localizable content identified by the identifier for each area, wherein the localizable content comprises a localized text string and a localizable setting for a property for each area;
modifying each area of the requested media content in accordance with the localizable content obtained by using the identifiers;
further comprising caching the modified requested media requested content for further requests for media content having the associated culture; and
wherein the media content is modified by selecting and fetching resources from different external resources in response to the associated culture of the request for media content.

2. The computer-implemented method of claim 1, further comprising accessing a file to determine the external resource to be used for the associated culture.

3. The computer-implemented method of claim 1, wherein the requested media content comprises tags that comprise a unique identifier.

4. The computer-implemented method of claim 1, wherein the requested media content is parsed in response to a user selecting the media content.

5. The computer-implemented method of claim 4, wherein a data structure comprising controls is formed in response to the parsed media content.

6. The computer-implemented method of claim 5, wherein the controls are modified in accordance with the localized information for the associated culture.

7. The computer-implemented method of claim 1, wherein the requested media content comprises a runtime object inserted by a web developer.

8. The computer-implemented method of claim 1, wherein the requested media content comprises static content and tags.

9. A computer-readable storage media that is not a signal for dynamically localizing content, comprising instructions for:
receiving a request for media content within a web page including components, wherein the request is received from a client having an associated culture;
generating code that is used to render the web page, wherein the code dynamically determines the localizable content on a per-culture basis during run-time;
storing the code generated and using the stored code for any subsequent request for the media content regardless of the associated culture of the client;
searching the requested media content for areas of localizable content wherein each area is associated with an identifier; wherein each identifier is a tag identifying the component and comprises an attribute name; wherein the localizable content comprises text and properties associated with the component;
using the identifiers of the localizable content to reference at least one information source containing localized information for the associated culture to obtain localizable content identified by the identifier for each area, wherein the localizable content comprises a localized text string and a localizable setting for a property for each area;

modifying areas of the requested media content in accordance with the localizable content obtained by using the identifiers;

further comprising caching the modified requested media requested content for further requests for media content having the associated culture; and wherein the media content is modified by selecting and fetching resources from different external resources in response to the associated culture of the request for media content.

10. The computer-readable storage media of claim 9, further comprising accessing a file to determine the external resource to be used for the associated culture.

11. The computer-readable storage media of claim 9, wherein the requested media content comprises tags that comprise a unique identifier.

12. The computer-readable media of claim 9, wherein the requested media content is parsed in response to a user selecting the media content.

13. The computer-readable media of claim 12, wherein a data structure comprising controls is formed in response to the parsed media content.

14. A system for dynamically localizing content comprising:

a computing device that includes a processing unit, and a system memory, wherein the computing device is arranged to perform actions, comprising:

receiving a request for media content within a web page, wherein the request is received from a client having an associated culture;

generating code that is used to render the web page, wherein the code dynamically determines the localizable content on a per-culture basis during run-time;

storing the code generated and using the stored code for any subsequent request for the media content regardless of the associated culture of the client;

searching the requested media content for areas of localizable content wherein each area is associated with an identifier; wherein each identifier is a tag identifying a component and comprises an attribute name; wherein the localizable content comprises text and properties associated with the component;

using the identifiers of the localizable content to reference at least one information source containing localized information for the associated culture to obtain localizable content identified by the identifier for each area, wherein the localizable content comprises a localized text string and a localizable setting for a property for each area;

modifying areas of the requested media content in accordance with the localizable content obtained by using the identifiers;

further comprising caching the modified requested media requested content for further requests for media content having the associated culture; and wherein the media content is modified by selecting and fetching resources from different external resources in response to the associated culture of the request for media content.

15. The system of claim 14, further comprising accessing a file to determine the external resource to be used for the associated culture.

16. The system of claim 14, wherein the requested media content comprises a unique identifier.

17. The system of claim 14, wherein the requested media content is parsed in response to a user selecting the media content.

18. The system of claim 17, wherein a data structure is formed in response to the parsed media content.

* * * * *